United States Patent [19]
Kaul et al.

[11] Patent Number: 5,470,921
[45] Date of Patent: Nov. 28, 1995

[54] SYNTHETIC POLYAMIDES AND THEIR SALTS

[75] Inventors: Bansi L. Kaul, Biel-Benken, Switzerland; Angelos-Elie Vougioukas, St. Louis, France; Jürgen Goldmann, Münchenstein, Switzerland

[73] Assignee: Sandoz Ltd., Basel, Switzerland

[21] Appl. No.: 247,132

[22] Filed: May 20, 1994

Related U.S. Application Data

[63] Continuation of Ser. No. 727,506, filed as PCT/EP90/01495, Sep. 6, 1990, abandoned.

[30] Foreign Application Priority Data

Sep. 9, 1989 [DE] Germany ............ 39 30 089.7
Oct. 3, 1989 [DE] Germany ............ 39 32 912.7

[51] Int. Cl.⁶ ................................................ C08G 69/32
[52] U.S. Cl. .................. 525/432; 548/518; 548/557; 548/565; 548/566; 548/567; 548/570; 548/572; 528/340; 528/341; 528/347; 544/71; 544/196; 544/197; 544/198; 544/205; 544/206; 544/207; 544/208; 544/209; 544/211; 544/212; 546/19; 546/187; 546/189; 546/191; 546/208; 546/222; 546/223; 546/224; 546/225; 546/227; 546/231; 546/232

[58] Field of Search ........................ 525/432; 528/340, 528/341, 347; 544/71, 196, 197, 198, 205, 206, 207, 208, 211, 212; 546/19, 187, 189, 191, 208, 222, 223, 224, 225, 227, 231, 232

[56] References Cited

U.S. PATENT DOCUMENTS

| | | | |
|---|---|---|---|
| 3,920,611 | 11/1975 | del Rio | 528/341 |
| 4,086,204 | 4/1978 | Cassandrini | 260/45.8 |
| 4,232,131 | 11/1980 | Rody et al. | 528/335 |
| 4,233,412 | 11/1980 | Rody | 525/167 |
| 4,256,627 | 3/1981 | Moser | 260/45.75 |
| 4,348,524 | 9/1982 | Karrer | 546/187 |
| 4,477,615 | 10/1984 | Raspanti | 524/100 |
| 4,578,454 | 3/1986 | Cantatore | 528/327 |
| 4,692,486 | 9/1987 | Gugumus | 524/100 |
| 5,318,851 | 6/1994 | Baron | 428/413 |

FOREIGN PATENT DOCUMENTS

| | | |
|---|---|---|
| 904840 | 9/1986 | Belgium . |
| 0022501 | 1/1981 | European Pat. Off. . |
| 0079406 | 5/1983 | European Pat. Off. . |
| 0080431 | 6/1983 | European Pat. Off. . |
| 2479216 | 11/1981 | France . |
| 1935632 | 12/1970 | Germany . |
| 2636144 | 6/1976 | Germany . |
| 3315115 | 11/1983 | Germany . |
| 60-094457 | 5/1985 | Japan . |
| 9103511 | 3/1991 | WIPO .................. 528/340 |

OTHER PUBLICATIONS

PCT Search Report for PCT/EP 90/01495 dated 28, Nov. 1990.
Patent Abstracts of Japan, vol. 9, No. 237 (C–305) (1960) dated 24 Sep. 1985 for JP 60–094457.

*Primary Examiner*—James J. Seidleck
*Assistant Examiner*—R. F. Johnson
*Attorney, Agent, or Firm*—Robert S. Honor; Carl W. Battle; Michael P. Morris

[57] ABSTRACT

A synthetic polyamide of formula I and its salts

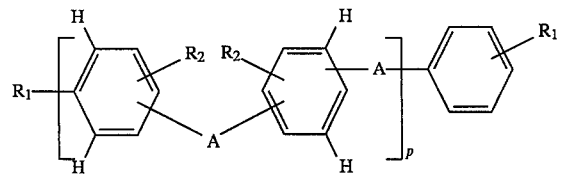

in which each $R_1$ independently is selected from hydrogen, carboxyl, amino or a group of formula α

$$-A_1-R_{10} \qquad (\alpha)$$

where $A_1$ is a bridging group and $R_{10}$ is a sterically hindered amine group;
each $R_2$ independently is hydrogen or a group of formula α

A is a bridging group of the formula

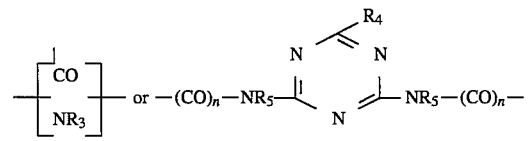

is 0 or 1;

$R_3$ is hydrogen, $C_{1-12}$alkyl or is a significance of $R_{10}$;

$R_5$ is hydrogen or $C_{1-12}$alkyl $R_4$ is a significance of $R_{10}$ or a group of formula α; and p is an integer from 5 to 200;
with the proviso that the compound of formula I contains 1–400 sterically hindered amine groups.

14 Claims, No Drawings

SYNTHETIC POLYAMIDES AND THEIR SALTS

This is a continuation of application Ser. No. 07/727,506, filed Jul. 9, 1991, now abandoned, which in turn is a continuation-in-part of International Application No. PCT/EP 90/01495, filed Sep. 6, 1990 (designating the USA) claiming priority from P3930089.7 filed on 9th Sep. 1989 in Germany and P3932912.7 filed 3rd Oct. 1989 in Germany. The invention relates to synthetic polyamide of aromatic character and their salts containing sterically hindered amine groups which are not part of the polyamide recurring backbone but are in a side chain attached to the said backbone.

According to the invention there is provided a compound of formula I

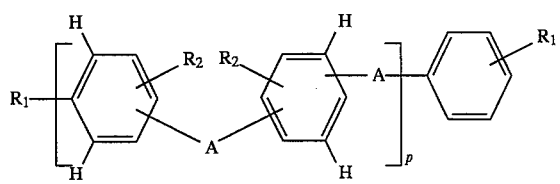

in which each $R_1$ independently is selected from hydrogen, carboxyl, amino or a group of formula α

where $A_1$ is a bridging group and $R_{10}$ is a sterically hindered amine group;

each $R_2$ independently is hydrogen or a group of formula α (preferably hydrogen);

each A is, independently of the other, a bridging group of the formula

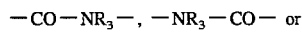

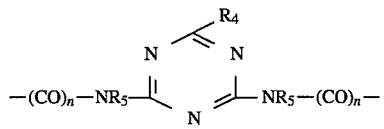

n is 0 or 1;

$R_3$ is hydrogen, $C_{1-12}$alkyl or is a significance of $R_{10}$, independent of $R_{10}$ (preferably hydrogen), $R_5$ is hydrogen or $C_{1-12}$alkyl (preferably hydrogen) and $R_4$ is a significance of $R_{10}$, independent of $R_{10}$, or a group of formula α, $NH(C_{1-4}alkyl)$ or

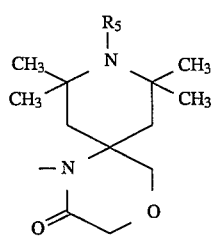

p is an integer from 5 to 200 (preferably 10–100, more preferably 10 to 30), with the proviso that the compound of formula I contains 1–400 (preferably 2 to 100, more preferably 2 to 30) sterically hindered amine groups.

In this Specification where a symbol appears more than once in a formula, its significances are independent of one another unless indicated to the contrary.

In this specification, preferably any $R_{10}$ independently is $R_{10}'$, where $R_{10}'$ is a group of formula a to e

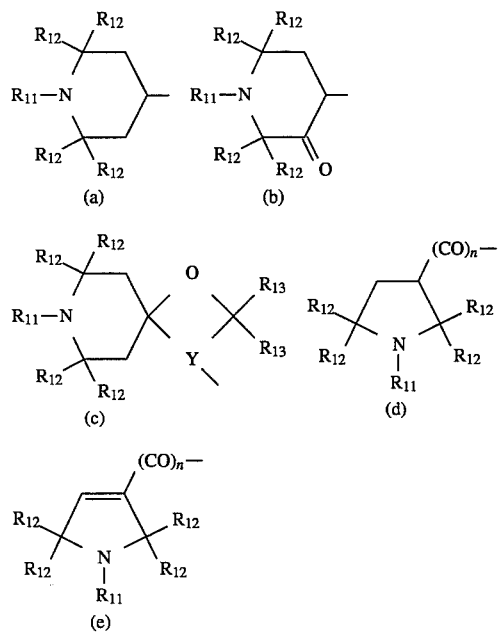

in which $R_{11}$ is hydrogen or $C_{1-4}$alkyl, preferably hydrogen or $C_{1-2}$ alkyl;

each $R_{12}$ independently is $C_{1-5}$alkyl (preferably methyl), each $R_{13}$ independently is hydrogen, $C_{1-2}$alkyl or one group $R_{13}$ is phenyl and the other $R_{13}$ is hydrogen or $C_{1-2}$alkyl or both groups $R_{13}$ together form a group of the formula $-(CH_2)_{11}-$ and Y is -N-CO- or -CO-N-, wherein one of the two free valence bonds attached to each nitrogen corresponds to the free valence bond attached to Y in formula (c).

More preferably $R_{10}$ is a group of formula a) most preferably wherein $R_{11}$ is hydrogen or methyl or $R_{12}$ is methyl.

Preferably $A_1$ is $A_1'$ where $A_1'$ is $-NR_5-$, $-CO-NR_5-$, $-NR_5-CO-$, $-O-CO-$ (where CO- is attached to the benzene

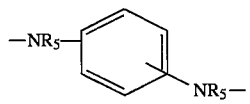

$-NR_5-CH_2-CO-NR_3-$ (where $NR_5$ is attached to the benzene in both preceding radicals)

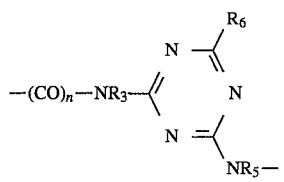

or

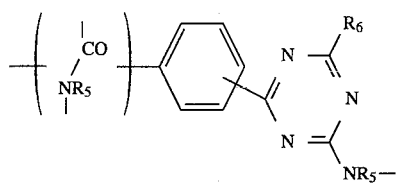

(in which, in the last two formulae, the nitrogen atom of the group $-NR_5-$ attached to the triazine group is preferably attached to $R_{10}$ and, in the last formula, the group in brackets may be $-CO-NR_5-$ or $-NR_5-CO-$), where $R_6$ is a group of the formula

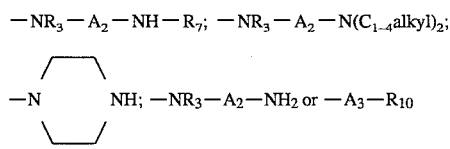

where $A_2$ is $C_{1-6}$alkylene $R_7$ is $C_{1-4}$alkyl $A_3$ i

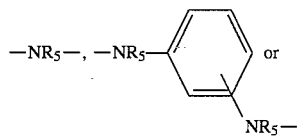

$-NR_3-A_2-NR_5-$; and n is 0 or 1.

Compounds of formula I can be prepared by reacting 1–2 moles in total (or one mole plus excess) of a compound of formula II or III

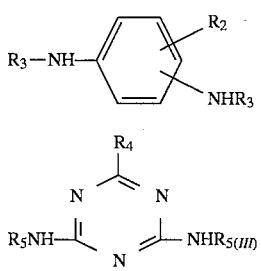

or a mixture of these compounds with 1–2 moles (or one mole plus excess) of a compound of formula IV below or with a compound of formula V

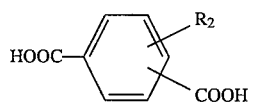

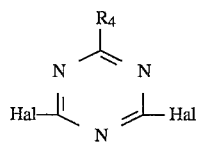

provided at least a compound of formula II or IV is a reactant; where Hal is halogen or a mixture of these compounds (where in the place of the free acids the acid halides are preferably used), wherein the groups $R_2$ and/or $R_3$ contain at least 1 sterically hindered amino group.

The chain length of the new compounds according to the invention can be regulated by introducing amounts of appropriate compounds of formula VI or VII or a compound containing a group of formula α

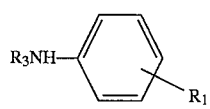

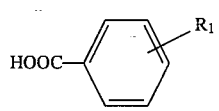

or by regulating the amount of compounds used from which groups a) to e) above are derived. Such regulation is well known to a man skilled in the art.

Compounds of formula I according to the invention, both those with a high hindered amine content and those with a low hindered amine content per repeating unit can be used as coatings or spun to form fibers or threads which can be made into fabrics and knitted to make goods and can be dyed with anionic dyestuffs (particularly those known to be suitable for dyeing synthethic polyamide material). The compounds containing a high content of hindered amines may also be used for salt formation when mixed with a required amount of dyestuff, or an optical brightener or another stabiliser. As such these salt compounds are mixed, preferably in the form of a solution (e.g. in dimethylacetamide) with unmodified aromatic polyamide (e.g. "Nomex" by Du Pont).

The resulting polyamide has good fastness to light, oxidation and to heat, as well as having good wet fastness properties.

Those polyamides of formula I which are soluble in lacquers and/or printing inks can be used therein to increase the light stability.

Further according to the invention there are provided a polymeric composition comprising a compound of formula I and a polymeric material. Preferably the polymeric material is polyamide in a polymeric composition according to the invention.

Preferably 1% to 10%, (more preferably 2% to 5%) of the compound of formula I is present in such a polymeric composition, all weights being based on the weight of the total composition. Such compositions can be used as plastic materials or in printing inks or lacquers.

The compounds of formula I can also be used in the preparation of carrier material for chromatography or for peptide synthesis. In these cases the amount of sterically hindered groups can vary greatly. The retention properties of the compounds of formula I (preferably when used in powder or granulated form) are good.

The new compounds according to the invention can be easily dyed with anionic dyestuffs both in mass as well as by exhaustion dyeing and the resulting dyed products can, in turn, be used in small amounts to produce good dyeings in other plastics, in particular other types of aromatic polyamides which until recently have been very poorly dyeable. The dyeings produced on such other types of polyamides show good light fastness, good heat and wet fastness properties as well as improved stability of the dyed substance against light, heat and oxidation. The compounds of formula I despite the sterically hindered amines have good migration fastness. Further the new compounds according to the invention can act as a material for chromatographic purposes and polypeptides synthesis, in particular for high performance chromatographic systems and as a media for separation of biomolecules from non-biomolecules.

Compounds of the formula I are particularly reactive towards anionic optical brighteners or with anionic plastics stabilisers, for example UV stabilisers such as sulfonated 2(2-hydroxyphenyl) benztriazoles or 2-hydroxybenzophenones. The compounds of formula I can be reacted with acid dyestuffs and with optical brighteners and the stabilisers as mentioned above to form salts of such products. Such salts can be mixed with polyamide. Such a salt can be added in the usual amounts for example for plastics 0.05% to 10% preferably 0.01% to 5% by weight based on the amount of plastics composition.

The invention will now be illustrated by the following Examples, in which the parts are parts by weight and all temperatures are in °C.

Example 1

872 parts of N-methylpyrrolidone are poured into a 1.5l reaction vessel.

28.35 parts (0.2625 moles) of 1,4-diaminobenzene are added at 20° C. +/– 2°. The mixture is cooled to 0° and 50.75 parts (0.25 mole of benzene 1,4-dicarboxylic acid dichloride (terephthaloyl dichloride) are added portion by portion stirring well and at a constant temperature.

After this, the mixture is heated for 4 hours in stages from 20° to 80° C.

5.3 parts (0.125 moles) of 2-chloro-4,6-bis-(2',2',6',6'-tetramethyl piperidyl-4'-amino)-triazine are added and the mixture is stirred for 4 hours at 100° C. The resulting precipitate is separated by filtration and washing with water from the liquid phase and is dried at 100° C. under vacuum of 20 mm Hg.

66 parts of a light beige powder results with good properties, for example improved dyeability.

Further compounds according to the invention can be made by reacting 0.2625 moles of the compound in column I of Table 1 with 0.25 moles of the compound of column II of Table 1 and 0.125 moles of the chloro compound of column III of Table 1.

$R_{60}$ in the following Tables is the group 2,2,6,6- tetramethylpiperidyl-4 and $R_{70}$ is 1,2,2,6,6 pentamethyl piperidyl-4.

TABLE 1

| Ex | I | II | III |
|---|---|---|---|
| 2 | 1,3-Diamino-benzene | benzene-1,3 dicarboxylic acid dichloride | 2-Chloro-4,6-(2',2',6',6',-tetramethylpiperidyl-4-amino)-triazine |
| 3 | 1,3-Diamino-benzene | benzene-1,3 dicarboxylic acid dichloride | ClCO—⟨benzene⟩—NH—⟨triazine with NH—$R_{60}$ groups⟩ |
| 4 | 1,4-Diamino-benzene | benzene-1,4-dicarboxylic acid dichloride | ClCO—⟨benzene⟩—NH—⟨triazine with NH—$R_{60}$ groups⟩ |
| 5 | 1,3-Diamino-benzene | benzene-1,3-dicarboxylic acid dichloride | ClCO—⟨benzene⟩—NH—⟨triazine with NH—$R_{60}$ groups⟩ |
| 6 | 1,3-Diamino-benzene | benzene-1,3-dicarboxylic acid dichloride | Cl—⟨triazine with NH—$R_{60}$ and $R_{60}$ groups⟩ |

TABLE 1-continued

| Ex | I | II | III |
|---|---|---|---|
| 7 | 1,3-Diamino-benzene | benzene-1,3-dicarboxylic acid dichloride | 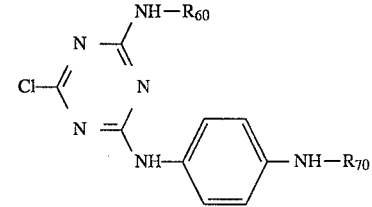 |
| 8 | 1,4-Diamino-benzene | benzene-1,4-dicarboxylic acid dichloride | 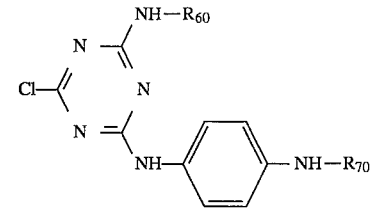 |
| 9 | 1,4-Diamino-benzene | benzene-1,4-dicarboxylic acid dichloride | 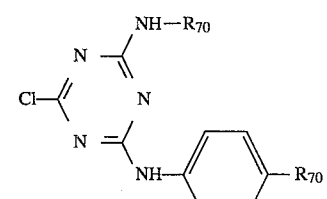 |
| 10 | 1,3-Diamino-benzene | benzene-1,3-dicarboxylic dichloride | 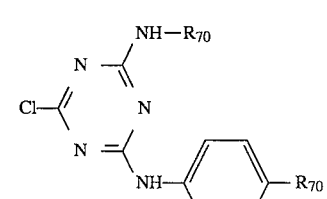 |
| 11 | 1,3-Diamino-benzene | benzene-1,3-dicarboxylic dichloride | 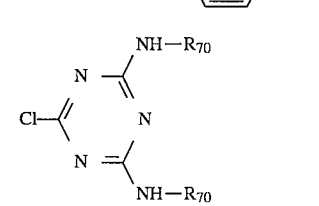 |
| 12 | 1,4-Diamino-benzene | benzene-1,4-dicarboxylic acid dichloride | 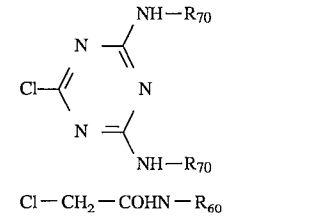 |
| 13 | 1,4-Diamino-benzene | benzene-1,4-dicarboxylic acid dichloride | $Cl-CH_2-COHN-R_{60}$ |
| 14 | 1,3-Diamino-benzene | benzene-1,3-dicarboxylic acid dichloride | $Cl-CH_2-COHN-R_{60}$ |

TABLE 1-continued

| Ex I | II | III |
|---|---|---|
| 15 1,3-Diamino-benzene | benzene-1,3-dicarboxylic acid dichloride | 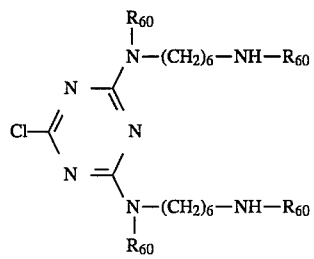 |
| 16 1,4-Diamino-benzene | benzene-1,4-dicarboxylic acid dichloride | 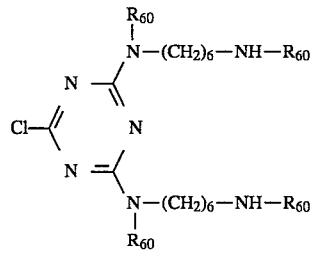 |
| 17 1,4-Diamino-benzene | benzene-1,4-dicarboxylic acid dichloride | 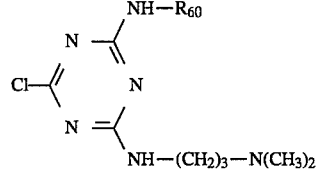 |
| 18 1,3-Diamino-benzene | benzene-1,3-dicarboxylic acid dichloride | 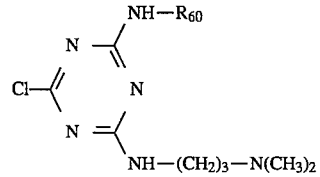 |
| 19 1,3-Diamino-benzene | benzene-1,3-dicarboxylic acid dichloride | 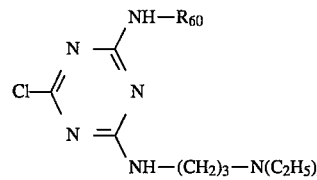 |
| 20 1,4-Diamino-benzene | benzene-1,4-dicarboxylic acid dichloride | 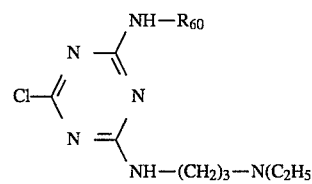 |

Example 21–39

872 parts N-methylpyrrolidone is poured into a 1.5 liter reaction vessel at 20° C, +/− 2° C. 27.0 parts (0.25 moles) of 1,4-diaminobenzene are dissolved therein and then, at 0° C., 51 parts (0.25125 moles) of benzene-1,4-dicarboxylic acid dichloride are added. Over 4 hours the temperature is brought, in stages, from 20° C. to 80° C. and 0.3 parts (0.0125 moles) of 1-amino-4-(2',2',6',6'-tetramethylpiperidinyl -4'-amino)-benzene are added and the mixture is stirred for 4 hours at 100° C. The resulting solid is then filtered at 100° C. washed with water at 20° C. and dried at 100° C. under 20 mm Hg.

61.3 parts of a modified polyamide with improved properties results.

Further modified polyamides can be made according to Example 1 using 0.25 moles of the amine of column I with 0.25125 moles of the compound of column II and 0.0125 moles of the amino compound of column III of Table 2.

TABLE 2

| Ex | I | II | III |
|---|---|---|---|
| 22 | 1,3-Diamino-benzene | benzene-1,3-dicarboxylic acid dichloride | $H_2N\text{–}C_6H_4\text{–}NH\text{–}R_{60}$ |
| 23 | 1,3-Diamino-benzene | benzene-1,3-dicarboxylic acid dichloride | $H_2N\text{–}C_6H_4\text{–}NH\text{–}C(=N)\text{–}N\text{=}C(NH\text{–}R_{60})\text{–}N\text{=}C\text{–}NH\text{–}R_{60}$ (triazine with two $NH\text{–}R_{60}$ groups) |
| 24 | 1,4-Diamino-benzene | benzene-1,4-dicarboxylic acid dichloride | $H_2N\text{–}C_6H_4\text{–}NH\text{–}C(=N)\text{–}N\text{=}C(NH\text{–}R_{60})\text{–}N\text{=}C\text{–}NH\text{–}R_{60}$ (triazine with two $NH\text{–}R_{60}$ groups) |
| 25 | 1,4-Diamino-benzene | benzene-1,4-dicarboxylic acid dichloride | 3,5-diamino-$C_6H_3$–$CONH\text{–}R_{60}$ |
| 26 | 1,3-Diamino-benzene | benzene-1,3-dicarboxylic acid dichloride | 3,5-diamino-$C_6H_3$–$CONH\text{–}R_{60}$ |
| 27 | 1,3-Diamino-benzene | benzene-1,3-dicarboxylic acid dichloride | 2,4-diamino-$C_6H_3$–$CONH\text{–}R_{60}$ |
| 28 | 1,4-Diamino-benzene | benzene-1,4-dicarboxylic acid dichloride | 2,4-diamino-$C_6H_3$–$CONH\text{–}R_{60}$ |
| 29 | 1,4-Diamino-benzene | benzene-1,4-dicarboxylic acid dichloride | triazine: $H_2N(CH_2)_3\text{–}HN\text{–}$ and $\text{–}NH\text{–}(CH_2)_3\text{–}NH_2$ substituents, with $NH\text{–}R_{60}$ |
| 30 | 1,3-Diamino-benzene | benzene-1,4-dicarboxylic acid dichloride | triazine: $H_2N(CH_2)_3\text{–}HN\text{–}$ and $\text{–}NH\text{–}(CH_2)_3\text{–}NH_2$ substituents, with $NH\text{–}R_{60}$ |
| 31 | 1,3-Diamino-benzene | benzene-1,4-dicarboxylic acid dichloride | triazine: $H_2N(CH_2)_4\text{–}HN\text{–}$ and $\text{–}NH\text{–}(CH_2)_4\text{–}NH_2$ substituents, with $NH\text{–}R_{60}$ |

TABLE 2-continued

| Ex I | II | III |
|---|---|---|
| 32 1,4-Diamino-benzene | benzene-1,4-dicarboxylic acid dichloride | structure with $H_2N(CH_2)_4-HN$ and $NH-(CH_2)_4-NH_2$ groups, $NH-R_{60}$ |
| 33 1,4-Diamino-benzene | benzene-1,4-dicarboxylic acid dichloride | bis-piperazinyl structure, $NH-R_{60}$ |
| 34 1,3-Diamino-benzene | benzene-1,3-dicarboxylic acid dichloride | bis-piperazinyl structure, $NH-R_{60}$ |
| 35 1,3-Diamino-benzene | benzene-1,3-dicarboxylic acid dichloride | piperazinyl structure, two $NH-R_{60}$ |
| 36 1,4-Diamino-benzene | benzene-1,4-dicarboxylic acid dichloride | piperazinyl structure, two $NH-R_{60}$ |

Example 37

98 parts of a nylon 6 granulate are mixed with 2 parts of the product of Example 1 in a powder mixer (Rhoenrad) for 1 hour and then are extruded using a laboratory extruder (Type MARIS TM 33 V/32 D) under the following conditions and then are spun.

| Speed of the screw | 321 rpm | | | |
|---|---|---|---|---|
| Rate of dosage | 40% | | | |
| Yield | 23 kg/hour | | | |
| Pressure | 2 bars | | | |
| Temperature in Zones | 1 | 2 to 6 | 7 | 8 and 9 |
| | 168° | 300° | 259° | 263° |

The resulting fibers can be used as such or can be worked into fabric knitted goods, or yarns which is usual for polyamide fiber materials.

Example 37 can be repeated using instead of the product of Example 1, 2 parts of the product of any one of the Examples 2–36.

The resulting polyamide material can be dyed with acid dyes for example with the following dyestuffs;

C.I. Acid Red 216
C.I. Acid Violet 66
C.I. Acid Yellow 155
C.I. Acid Blue 230,
C.I. Acid Red 129,
C.I. Acid Red 184,
C.I. Acid Red 119, or
C.I. Acid Blue.

The resulting dyeings show a good depth of color (comparable to the same dyeing on non-modified polycaprolactam) and have a good brilliance and have good light and wash fast properties.

Example 38

14.5 parts of 3,5 diaminobenzoic acid-2',2',6',6'-tetramethyl-piperidyl-4-amide (produced by the condensation of 3,5-dinitrobenzoic acid with 2,2,6,6-tetramethyl-4-aminopiperidyl and reduction of the nitro groups) are dissolved in 206 parts of anhydrous N-methylpyrrolidone. The solution is cooled to a temperature of 0° to 5° and 10.15 parts isophthalic acid dichloride are added portion by portion within 1 hour. The resultant mixture is stirred for 2 hours at 20°–25° and then for 6 hours at 100°. The N-methylpyrrolidone is then distilled off under vacuum. The viscous mass is then stirred in 250 parts of acetone and a light beige precipitate forms which is separated by filtration. The residue is stirred in 200 parts of 2% sodium hydroxide at room temperature filtered then washed neutral in 200 parts of water in four portions and dried at 80° under vacuum of about 50 Pa. The molecular weight of the resulting polyamide is about 6,400 having a melting point of over 300°.

Example 39

A very similar product to that obtained according to Example 38 is produced, when in the place of 14.5 parts 3,5-diaminobenzoic acid -(2',2',6',6',-tetramethylpiperidyl-4'-)-amide 3,5-diaminobenzoic acid-1',2',2',6',6'-pentamethylpiperidyl-4'-amide is used.

Examples 40 and 41

According to the method of Example 38, 12.35 parts of 4-(2',2',6',6'-tetramethylpipieridyl-4'-amino)-aniline (produced by condensation of para-chloro-nitrobenzene with 2,2,6,6,-tetramethyl- 4-aminopiperidine and reduction of the nitro group) or 13.05 parts of 4-(1',2',2',6',6'-pentamethylpiperidyl-4'-amino-)-aniline are reacted with 10.15 parts of isophthalic acid dichloride. The resulting products are very similar to those obtained in Examples 38 and 39.

Example 42 to 45

The reactions according to Examples 38 to 41 are repeated, but in the place of isophthalic acid dichloride the same quantity of terephthalic acid dichloride is used. The resulting products are very similar to those of Examples 38 to 41.

Example 46

98 parts of a commercial soluble aromatic polyamide poly-metaphenylene-isophthalamide ("Nomex" from Du Pont) are mixed with 2 parts of the product of Example 38, dissolved in 400 parts dimethylacetamide and spun into fibers, according to known methods. The resulting fibers can be dyed, by exhaustion, with 1 part (ca. 1% dyeing) of the dyes listed in Example 37. The resulting deep dyeings are very brilliant and fast to washing, light and oxidation.

Example 47

14.5 parts of 3,5 diaminobenzoic acid-2',2',6',6'-tetramethyl -piperidyl-4-amide (produced by the condensation of 3,5-dinitrobenzoic acid with 2,2,6,6-tetramethyl-4-aminopiperidyl and reduction of the nitro groups) are dissolved in 206 parts of anhydrous N-methylpyrrolidone. The solution is cooled to a temperature of 0° to 5° and 10.15 parts isophthalic acid dichloride are added portion by portion within 1 hour. The resultant mixture is stirred for 2 hours at 20°–25° and then for 6 hours at 100°. The N-methylpyrrolidone is then distilled off under vacuum and the viscous residue together with 35.75 parts of C.I. Solvent Yellow 83, (sodium salt) is dispersed in 500 parts of water, stirred for 10 hours at room temperature filtered, washed with water and dried under vacuum at 100°. The resulting dye salt may then be used for dyeing synthetic polyamides of the Aramid type as follows:

A solution of 20 parts of poly-meta-phenylene-isophthalamide ("Nomex" of Du Pont) and 0.5 part of the dye salt in 85 parts of dimethylacetamide is spun under known conditions into fibers, which is a brilliant yellow dyeing that is fast to light and washing.

Example 48

Example 47 is repeated using instead of 35.75 parts of C.I. Solvent Yellow 83, 16.35 parts of the sodium salt of 2-(2'-hydroxy-3-sulfo- 5'-methylphenyl)-benzotriazole (for additionally improving the light fastness). A fabric results which is extremely fast to light, UV-radiation and weathering.

Example 49

Example 47 is repeated, using instead of 35.75 parts of C.I. Solvent Yellow 83, 20.35 parts of 1-(4'-sulphophenyl)-3-(-4"-chlorpheyl)- 2-pyrazoline (an optical brightener). This results in a fabric, the brightening aspect of which is very fast to washing and to light exposure.

Example 50

11.2 parts of 5-(1',2',2',5',5'-pentamethylpyrrolidyl-3'-carbonylamino)-isophthalic acid dichloride are added slowly under stirring, into a solution of 5.4 parts of para-phenylenediamine in 150 parts of N-methyl-pyrrolidone at 0° to 5° whilst cooling. Stirring is then continued for 2 hours at room temperature and for 6 hours at 100°. The resulting viscous mass is further treated and used as described in Examples 38 and 46 to 49.

Example 51

Example 50 is repeated using in the place of 11.2 parts of the pyrrolidyl-containing compound, 11.1 parts of 5-(1',2',2',5',5' -pentamethylpyrrolinyl-3'-carbonylamino)-isophthalic acid dichloride may be reacted. The resulting compound is very similar to that of Example 50.

Example 52

16.2 parts of 2,4-diethylamino-6-(2',2', 6',6'-tetramethylpiperdyl- 4'-oxy)-triazine are dissolved in 240 parts of N-methyl-pyrrolidone and the solution cooled to 0°–5°. Whilst stirring, 10.5 parts of terephthalic acid dichloride are added over 1 hour. Stirring is continued for 2 hours at about 20° and for 6 hours at 100°. The resulting polyamide may be used for enabling the dyeability of aromatic polyamides made with terephthalic acid ("Kevlar" of Du Pont) to be improved or, as such, in powder-form as a chromatographic substance.

2,4-Diethylamino-6-(2',2',6',6'-tetramethylpiperidyl-4-oxy)- triazine is produced by condensation of 1 mol of trichlorotriazine with 2 mol aminoethane and 1 mol 2,2,6,6-tetramethyl-4- hydroxypiperidine.

Example 53

Example 52 is repeated using in place of 2,4-diethylamino- 6-(2',2',6',6'-tetramethylpiperidyl-4-oxy)-triazine an equimolecular amount of a compound of formula

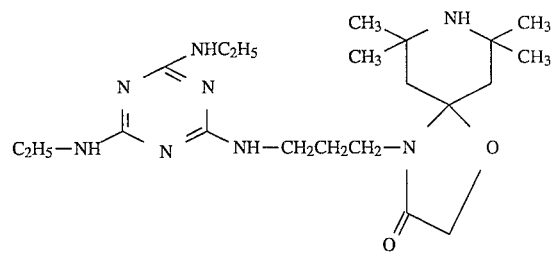

A product similar to that of Example 52 results.

Example 54

Example 52 is repeated using 18.95 parts of 2,4-Bis-(2', 2',6',6' -tetramethylpiperidyl-4-amino)-6-(2",2",6",6"-tetramethylpiperidyl -4-oxy)triazine in the place of 16.2 parts 2,4-diethylamino-6-( 2',2',6',6'-tetramethylpiperidyl-4-oxy)-triazine. An extremely active compound for chromatography is obtained.

Example 55

13.2 parts of 2,4-diamino-5-(2',2',6',6'-tetramethylpiperidyl- 4-amino)-benzene are condensed with 10.15 parts of isophthalic acid dichloride according to the method of Example 38. The resulting product is also a very useful compound for chromatography and for preparing dye salts with acid dyestuffs, further stabilisers or optical brighteners.

Example 56

Example 55 is repeated using 13.25 parts of 2,4-diamino-5-( 2',2',6',6'-tetramethylpiperidyl-4-oxy)benzene in the place of the 13.2 parts of the diaminobenzene. A product with similar properties is obtained.

We claim:

1. A compound of formula I, or salt form thereof

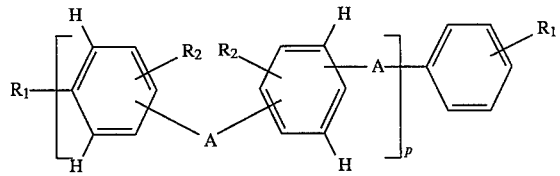

in which each $R_1$, independently is selected from hydrogen, carboxyl, amino or a group of formula α

$-A_1$-$R_{10}$      (α)

each $R_2$ independently is hydrogen or a group of formula α;

A is a bridging group of the formula -CO-$NR_3$-, -$NR_3$-CO- or

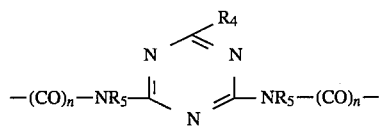

$A_1$ is a bridging group;
n is 0 or 1;
$R_3$ is hydrogen, $C_{1-12}$ alkyl or a group $R_{10}$;
$R_4$ is a group $R_{10}$ or a group of formula α,

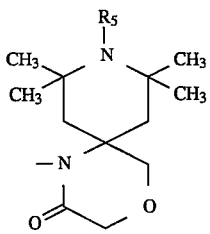

$R_5$ is hydrogen or $C_{1-12}$alkyl;
each $R_{10}$, independently, is a group of formula (a), (b), (c), (d) or (e)

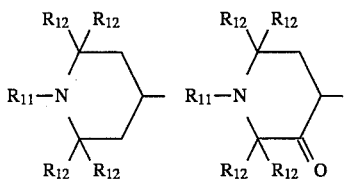

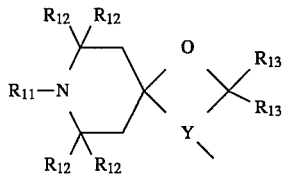

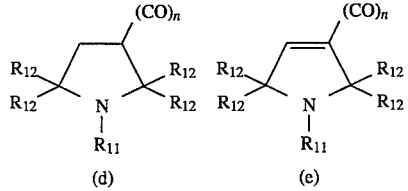

$R_{11}$ is hydrogen or $C_{1-4}$alkyl;
each $R_{12}$, independently, is $C_{1-5}$alkyl;
each $R_{13}$, independently, is hydrogen, $C_{1-2}$alkyl or one group $R_{13}$ is phenyl and the other $R_{13}$ is hydrogen or $C_{1-2}$alkyl or both groups $R_{13}$ together form a group of the formula -$(CH_2)_{11}$-;
Y is -N-CO- or -CO-N- wherein one of the two free valence bonds attached to each nitrogen corresponds to the free valence bond attached to Y in formula (c);
p is an integer from 5 to 200;
with the proviso that the compound of formula I contains 1–400 sterically hindered amine groups;
or a salt thereof.

2. The compound according to claim 1, in which $A_1$ is -$NR_5$-, -CO-$NR_5$-, -$NR_5$-CO-, -O-CO- (where CO- is attached to the benzene),

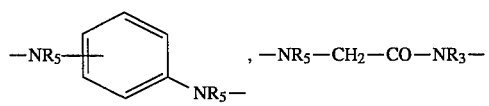

(where $NR_5$ is attached to the benzene),

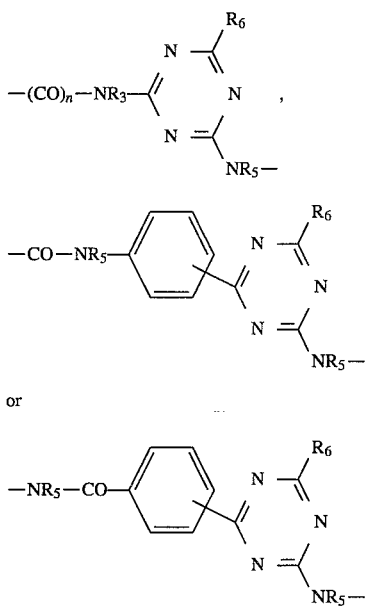

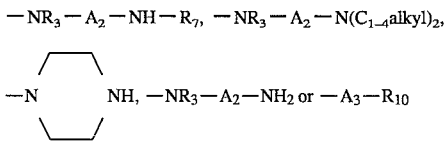

or

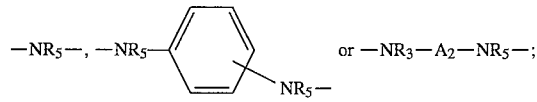

where $R_6$ is a group of the formula $-NR_3-A_2-NH-R_7$, $-NR_3-A_2-N(C_{1-4}alkyl)_2$, $-N\overbrace{\phantom{xxx}}NH$, $-NR_3-A_2-NH_2$ or $-A_3-R_{10}$ where
$A_2$ is $C_{1-6}$alkylene
$R_7$ is $C_{1-4alkyl}$
$A_3$ is $-NR_5-$, $-NR_5-\underset{NR_5-}{\underset{|}{\text{⌬}}}$ or $-NR_3-A_2-NR_5-$;

and $n$ is 0 or 1.

3. The compound according to claim 2 wherein, in formulae (a) to (e), $R_{11}$ is hydrogen or $C_{1-2}$alkyl and $R_{12}$ is methyl.

4. The compound according to claim 1 in which $R_2$ is hydrogen.

5. The compound according to claim 4 wherein each $R_2$, each $R_3$ and each $R_5$ is hydrogen.

6. The compound according to claim 5 wherein each $R_2$, each $R_3$ and each $R_5$ is hydrogen and p is an integer from 10 to 100.

7. The compound according to claim 2 wherein, when $A_1$ is of one of the formulae containing a triazine group, the nitrogen atom of the group $-NR_5-$ attached to said triazine group is also attached to $R_{10}$.

8. The compound according to claim 1 wherein $R_{10}$ is a group of formula (a).

9. The compound according to claim 2 wherein $R_{10}$ is a group of formula (a).

10. A composition comprising the compound of formula I according to claim 1 prepared by reacting 3,5- diaminobenzoic acid 1',2',2',6', 6'- pentamethylpiperidyl-4'-amide with isophthalic acid dichloride, and an aromatic polyamide other than the compound of formula I.

11. The composition comprising a compound of formula I according to claim 1 and a polyamide other than the compound of formula I.

12. The composition according to claim 11 comprising 1%–10% of a compound of formula I, based on the weight of the total composition.

13. A composition according to claim 11 the amount of said compound being 2%–5%, based on the weight of the total composition.

14. A composition according to claim 11 which is a plastics material or a printing ink or a lacquer.

* * * * *